United States Patent
Bhushan et al.

(10) Patent No.: US 11,806,815 B2
(45) Date of Patent: Nov. 7, 2023

(54) WIRE WELDER AND METHOD FOR WIRE WELDING

(71) Applicant: NV Bekaert SA, Zwevegem (BE)

(72) Inventors: Badgujar Bhushan, Pimple Saudager (IN); Santosh Hadawale, Maharshtra (IN)

(73) Assignee: NV BEKAERT SA, Zwevegem (BE)

( * ) Notice: Subject to any disclaimer, the term of this patent is extended or adjusted under 35 U.S.C. 154(b) by 394 days.

(21) Appl. No.: 16/955,297

(22) PCT Filed: Jan. 4, 2019

(86) PCT No.: PCT/EP2019/050164
§ 371 (c)(1),
(2) Date: Jun. 18, 2020

(87) PCT Pub. No.: WO2019/137856
PCT Pub. Date: Jul. 18, 2019

(65) Prior Publication Data
US 2020/0406405 A1 Dec. 31, 2020

(30) Foreign Application Priority Data
Jan. 12, 2018 (IN) .............................. 201811001442

(51) Int. Cl.
*B23K 37/00* (2006.01)
*B23K 31/12* (2006.01)
(Continued)

(52) U.S. Cl.
CPC ............ *B23K 31/125* (2013.01); *B21F 15/08* (2013.01); *B23K 37/0461* (2013.01); *B23K 2101/32* (2018.08)

(58) Field of Classification Search
CPC .............. B23K 2101/32; B23K 11/002; B23K 11/0026; B23K 20/004; B23K 2101/38;
(Continued)

(56) References Cited

U.S. PATENT DOCUMENTS 3,680,761 A * 8/1972 Rozmus ............... B23K 20/028
228/3.1
3,908,715 A 9/1975 Spiessens
(Continued)

FOREIGN PATENT DOCUMENTS

JP 09-24435 1/1997
WO 2011/138465 11/2011
(Continued)

OTHER PUBLICATIONS

International Search Report dated Apr. 4, 2019 in International (PCT) Application No. PCT/EP2019/050164.

Primary Examiner — Erin B Saad
(74) Attorney, Agent, or Firm — Wenderoth, Lind & Ponack, L.L.P.

(57) ABSTRACT

A welder containing a weld part, a clamp and a number of tools that is for welding metal wires end-to-end to one another. The tools have a tool indicator that is either in complete or in non-complete condition, and can be processing tools used to finish the weld or testing tools allowing testing the weld once finished. Before starting the welding the first metal wire is held in the clamp. By that action all tool indicators are set to the non-complete condition. When a processing tool has been used, its processing tool indicator is set to complete. When the weld has passed the specification of a testing tool, the testing tool indicator is set to complete. When each processing and testing tool indicator is
(Continued)

set to complete the clamp will open. In this case it is sure that the operator has done all necessary steps and checks on the weld.

10 Claims, 1 Drawing Sheet

(51) Int. Cl.
*B21F 15/08* (2006.01)
*B23K 37/04* (2006.01)
*B23K 101/32* (2006.01)

(58) Field of Classification Search
CPC .... B23K 26/24; B23K 31/125; B23K 33/006; B23K 10/006; B23K 11/252; B23K 11/253; B23K 20/028; B23K 2101/34
See application file for complete search history.

(56) References Cited

U.S. PATENT DOCUMENTS

| | | | | |
|---|---|---|---|---|
| 4,063,075 | A | * | 12/1977 | Collom ............... B23K 11/243 |
| | | | | 700/212 |
| 5,353,238 | A | * | 10/1994 | Neef ................... G05B 19/4063 |
| | | | | 702/184 |
| 2003/0100228 | A1 | | 5/2003 | Bungo et al. |
| 2013/0313234 | A1 | * | 11/2013 | Rokkaku ............. B23K 33/006 |
| | | | | 219/121.64 |
| 2017/0032281 | A1 | * | 2/2017 | Hsu ..................... G05B 23/0229 |

FOREIGN PATENT DOCUMENTS

| | | | | |
|---|---|---|---|---|
| WO | WO-2011138465 | A1 * | 11/2011 | ........... B23K 11/002 |
| WO | 2013/110360 | | 8/2013 | |
| WO | 2015/144427 | | 10/2015 | |

* cited by examiner

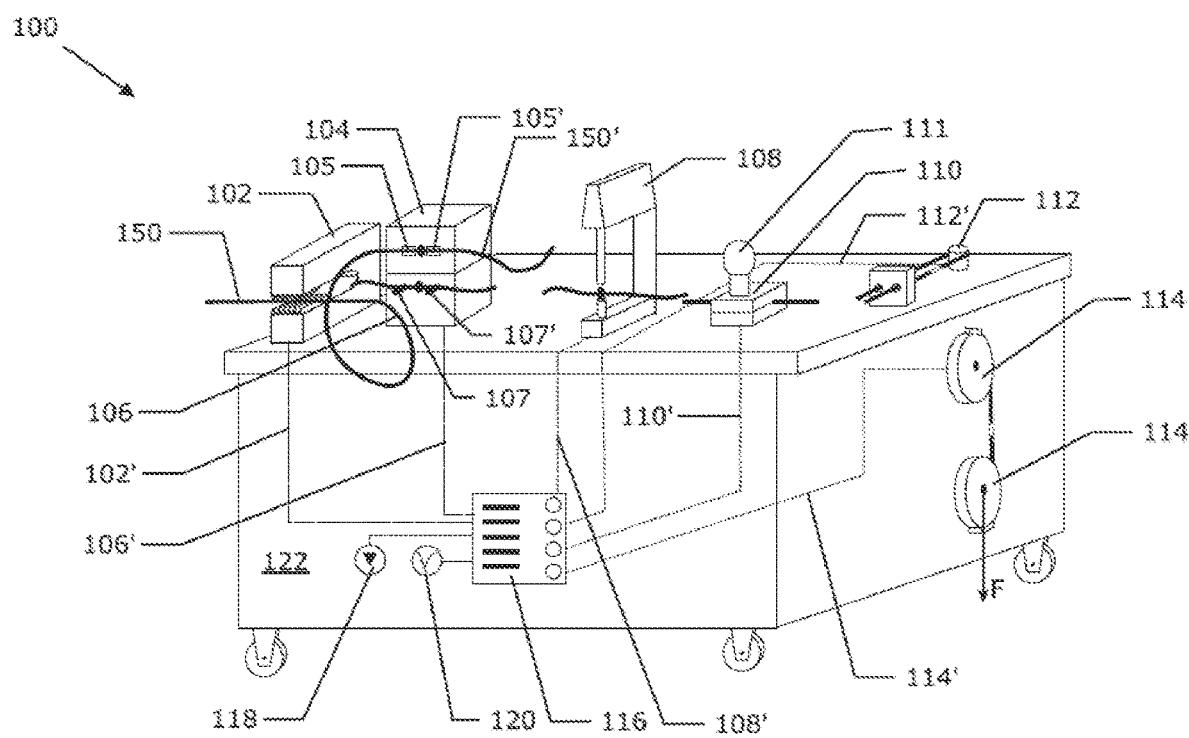

WIRE WELDER AND METHOD FOR WIRE WELDING

TECHNICAL FIELD

The invention relates to the field of welding of metal wires. The metal wires can be single filaments made of metal or cords that are composed of filaments made of metal. Possible metals are steel, copper, aluminium or any other metal or metal alloy although steel will be used as an exemplary metal throughout the application. The metal wires must flexible by hand.

BACKGROUND ART

The connection of different metal wires to one another is many times unavoidable in processes where metal wires are wound and unwound on spools. For example the ends of steel cords that are composed of multiple steel filaments twisted together must sometimes be connected to one another. Although different connections such as tying, twisting (see U.S. Pat. No. 3,908,715), or the use of a ferrule or a wire braid (WO2013/110360) have been suggested they all suffer from a local increase in diameter that in some applications cannot be tolerated.

When making a tyre for example, multiple steel cords are simultaneously and in parallel unwound from spools mounted on a pay-off creel and fed into a calander where the steel cords are covered with rubber. In the path from spool to rubber the steel cord has to pass narrow orifices and tightly spaced combs that do not tolerate a diameter increase of the steel cord of say more than 3%. Any larger diameter at a connection will obstruct the passage of the steel cord and lead to break of the connection cord or—even worse—may destroy the creel installation.

Welding is therefore still the most preferred way in which metal wires and in particular steel cord ends are connected to one another. The requirements that those welds have to meet are challenging in that the weld must not have a diameter larger than 3% of the original diameter, the weld must be able to pass guiding pulleys of small diameter and must be able to withstand a pull tension during processing.

Unfortunately, steel cords are hard to weld to one another as they are composed of multiple, thin steel filaments that cannot be aligned face to face and are difficult to provide with a flat end surface (in contrast with rods). Moreover, the filaments are made of drawn, strain hardened steel having a high tensile strength (generally over 2700 N/mm$^2$). The steel wire shows a drawn pearlitic structure. During the welding the steel is first brought just below melting temperature and then the wire ends are pressed against one another and subsequently cooled. The resulting metallographic structure upon fast cooling has a martensitic structure which is known to be strong but brittle. As a consequence the breaking load of the steel cord is never reached as there is no work hardening applied to the weld: the breaking load at the weld is about half of that of the steel cord.

By fine tuning the welding process and the design of the welder as described in WO 2015/144427 applicant has been able to increase the success rate significantly of welds. However, it remains compulsory that the weld is verified as to its suitability for its use which—in the case of a steel cord weld—means that the weld must have a low enough diameter, must be bendable and must be sufficiently strong. These properties must all be verified.

For an operator it is possible to forget one or more of those verification steps. Forgetting only one of those verification steps may—for example in case of the diameter verification when the diameter is larger than tolerable—result in great harm at the customer. Therefore the inventors have come up with the solution as described hereinafter.

DISCLOSURE OF INVENTION

The object of the invention is therefore to provide a welder wherein the different steps of making and testing a weld cannot be missed or forgotten. It is a further object of the invention to provide a welder that keeps track of the different steps to be followed in the welding procedure rather than the operator. It is a further object of the invention to ensure that every weld made complies with the requirements of the customer and inadvertent, involuntary errors by the welder operator are prevented. It is another object of the invention to enable the automation of the welding and testing procedure. It is a further object of the invention to provide a method to operate the described welder.

According a first object of the invention a welder with the features according claim 1 is presented. In the context of this application a 'welder' is a piece of equipment that comprises one or more tools that are mounted on a single workbench that is preferably mobile. This workbench is moved in the production area anywhere there is a need to make a weld. An essential part of the welder is of course that there is at least a welding piece of equipment on the welder, which will be called a 'welding part' hereinafter.

The welder is used for connecting a first metal wire to a second metal wire. Important in the use of the welder is that these first and second metal wires can be manipulated by hand. By this is meant that the operator must be able to guide the metal wire in whatever position is needed without the use of an excessive force. The welding of rods is therefore excluded for use with this invention. Metal cords—i.e. metal wires that are composed of several metal filaments—with a diameter smaller than 5 mm, 10 mm or even 12.5 mm can be welded with the welder. Metal cords with a diameter larger than about 12.5 mm are excluded as they become too stiff to handle. The metal can be any metal that is weldable such as copper, aluminium, hi carbon steel, stainless steel, etc. . . . . As already mentioned as reference material steel will be used but nothing prevents the use of the principles of the invention on other metal wires.

The welding part is for welding the end of the first metal wire to the end of the second metal wire whereby a weld is formed. In order to further finish and improve the welds a number of tools are available on the welder. The tools can either serve to process the weld, hereinafter called 'processing tools' or to test the weld hereinafter called 'testing tools'. A least one or more of said tools are present on the welder. Each of said tools has a 'tool indicator'. The tool indicators are set to the 'non-complete' condition prior to welding. Once the tool has been used the tool indicator is set to the 'complete' condition.

Specific about the welder is that a clamp is provided that clamps the first metal wire before welding. As the clamp closes, all tool indicators are set to the non-complete condition. Sufficient length should be available between the closed clamp and the first wire end to allow easy manipulation of the first wire end through all further tools.

The welding is performed by clamping the end of the first metal wire in a first weld beak and the end of the second metal wire in a second weld beak. The weld beaks can move along a common rail line and can be individually electrically activated by alternating or direct current. The ends of the first and second metal wire are carefully placed in the beaks such that their ends precisely meet when the clamps are moved to one another. Therefore grooves with a depth of less than about half of the diameter of the metal wire are provided in the weld beaks for aligning the metal wire ends.

After aligning and clamping the metal wire ends, electrical current is driven through the contact point and the metal wire starts to melt due to the higher resistance at the meeting point of the wires. Once the melting temperature of the metal wire is about to be reached the clamps are pressed towards another over an abutted distance. A blob of molten metal forms in between the clamps. In this blob, there are no individual filaments discernible anymore and they all coalesce in the weld blob.

After the clamps have been pressed to one another the electrical current is switched off or is at least seriously reduced (see WO 2015/144427 for different welding current procedures). The weld blob cools down and a weld is formed. It follows that—as the ends of the metal wires have been compressed to one another, while the same mass of material is still present—the diameter of the weld is larger than the diameter of the metal wire.

Although here specifically electrical welding has been suggested, other methods of welding such as flash welding or gas welding are not a priori excluded.

After the welding further finishing of the weld by means of processing tools remains necessary. Processing tools are for example:
a. As mentioned, the diameter at the weld is larger compared to the diameter of the metal wire. In order to prevent problems in downstream processing it is many times necessary to adjust the diameter of the weld. To this end the weld can e.g. be hammered in between two semi-cylindrical hammer blocks until the right diameter is achieved: a first diameter adjustment tool. An alternative diameter adjustment tool is e.g. a grinding or filing tool to circumferentially remove the extra mass in the area of the weld.
b. An annealing tool for annealing the weld. Indeed when steel is used the metallographic structure of the weld will be a martensitic structure that is hard and brittle. In order to improve its properties it is beneficial to anneal the weld up to a temperature of 500° C. to 700° C. The resulting recrystallized martensite is more ductile.
c. Another processing tool may for example be a coating tool—like a bath containing an electrolyte or even a brush—wherein the weld area is coated with e.g. a copper in order to maintain adhesion at the weld. Indeed any metallic coating—e.g. the brass coating of a steel cord—will melt into the weld and will no longer be present at the outside of the weld.

If any one of the above mentioned processing tools is used its respective tool indicator is set to the 'complete' condition.

Different combinations of processing tools may be necessary to finish the weld. These combinations are prescribed in function of the use of the weld and metal cord. Possible combinations are:
solely 'a', 'b' or 'c';
'a and b', 'a and c', 'b and c' and;
'a and b and c'.

However, the list of processing tools is not exhaustive and other processing tools may be added while still remaining within the scope of the invention.

In certain cases it may be that the weld after passing the processing tools is already suitable for further use. As all the necessary processing tools have been used and thus all tool indicators have been set to the complete condition the clamp will open and release the first metal wire. The weld can be wound back on the spool of the first or second metal wire end and the production can be continued.

However in many cases it is required that the weld passes certain criteria in order not to hamper in any further processing steps of the weld. Therefore in a further preferred embodiment of the invention the weld is subjected to some testing tools before being freed from the clamp.

Possible testing tools are for example:
d. A diameter tester for testing the diameter of the wire. This can be in the form of an orifice through which the weld has to pass or by means of a—possibly optical—measuring gauge that registers whether the measured diameter passes the specification of the weld diameter. If the weld passes the test the testing tool indicator is set to the 'complete' condition;
e. A bendability tester for testing the bendability of the weld. This can take for example the form of a wheel of a certain diameter over which the weld must be led without breaking. The rotation of the wheel is detected in order to set the testing tool indicator to 'complete';
f. A tensile tester for testing the strength of the weld. In such tester a specified load is applied to the weld that is considered sufficient in the further use of the weld. Of course this specified load must be smaller than the breaking load of the metal cord. If the weld is able to carry the specific load the testing tool indicator is set to 'complete';
g. Alternatively or additionally the electrical resistance of the weld can be tested. This can be of importance when welding metal cords that have to conduct electricity. If the weld passes the resistance specification the testing tool indicator is set to complete.
h. Alternatively or additionally the colour of the weld can be tested. The colour of the weld is an indication whether the coating has been applied to the weld.

Again the above list of testing tools is not exhaustive and other tests may be added without going out of the scope of the invention.

Also—depending on the need for further use of the weld—it may suffice that only individual tests are performed such as only 'd', 'e', 'f' or 'g'. Alternatively two or more tests may be need such as 'd and e', 'd and f', 'd and g', 'e and f', 'e and g' or 'f and g'. Also three test combinations may be required such as 'e and f and g', 'd and f and g', 'd and e and g' or 'd and e and f', or even all tests may be needed such as 'd and e and f and g'.

In a preferred embodiment the subsequent performance of the tests is automated to eliminate any operator bias. For example after the weld is finished it is clamped in a tensile tester comprising bending test wheels, a diameter tester and/or a colour tester. After the weld has been loaded to the specific load, it is guided over the bending wheels at a controlled tension while the diameter is measured.

Also any combinations of processing tools ('a' to 'c' above) with testing tools ('d' to 'g' above) is possible as long as at least one the testing or processing tools is present. In total $2^7-1$ i.e. 127 combinations or possible.

It may well be that after a first attempt of the operator the weld does not pass the tests. Further processing of the weld may be useful but then selectively processing and testing tools must be first set to the non-complete condition before the weld can be adapted. To this end the welder is provided by a reset button that selectively resets the tool indicators to the non-complete condition without opening of the clamp.

For example all processing and testing tool indicators can be reset to the non-complete condition. In that case the operator can only cut the weld and redo. Alternatively only the testing tools indicators can be reset to the non-complete condition. If for example the diameter test is not passed some further grinding of the weld may enable the weld to pass the diameter test. Of course the weld must then also be tested for the other tests as the reduced diameter may have led to a reduced strength of the weld. Therefore it is advisable to always reset at least the testing tool indicators 'en bloc', altogether.

As one of the metal wire ends remains blocked in the clamp of the welder, dangerous situations may occur when the first metal wire is possibly still on a spool of a machine. As a safety measure it is therefore strongly advised to provide an emergency circuit that immediately opens the clamp when activated. A possible emergency circuit is for example an emergency button that the operator can push when need arises. Even better is if the clamp opens automatically if a certain threshold tension is reached on the clamp which is detected by the emergency circuit e.g. by means of strain gauges mounted at the foot of the clamp.

In order to avoid abusive use of the emergency circuit—for example to release a non-compliant weld—the clamp can be provided with a cutter that cuts the first metal wire prior to release. In that case there is no other option than to make a new weld. Such cutter additionally increases safety as then also the connection between first metal wire and second metal wire is broken with certitude, hence the connection cannot lead to fall or entanglement accidents.

According a second aspect of the invention, methods are provided for operating the above described welder. Operating the welder goes by the following steps:

a. A first metal wire that is e.g. comes out of the production machine and a second metal wire that is e.g. on the spool on which the production machine feeds the metal wire are provided;

b. The first metal wire is clamped in the clamp of the welder and at the same time all tool indicators are set to the non-complete condition.

c. The operator can now make the weld by means of the weld part on the welder;

d. When the weld is finished it must be processed through the processing tools for finishing the weld;

e. Only if all the tool indicators are in the complete condition the clamp opens and the first metal wire is released.

Additionally a step (d') can be performed wherein the weld is subjected to testing tools after having processed the weld through the processing tools and before the clamp is opened i.e. the tool indicators of the processing tools and the tool indicators of the testing tools must meet the 'complete' condition.

When something goes wrong during the processing or the testing of the weld a reset button can be pushed in order to redo any step after step (b) but prior to the release out of the clamp of the first metal wire step (e).

When the safety of the operator is threatened an emergency circuit is activated that reopens the clamp. The emergency circuit can be activated by the operator or automatically for example when too much force is exerted on the clamp. Additionally the clamp may be provided with a cutter that also cuts the first metal wire whenever the emergency circuit is activated. This may completely eliminate any entanglement danger as there is no more connection between first and second metal wire.

BRIEF DESCRIPTION OF FIGURES IN THE DRAWINGS

The FIGURE shows an embodiment of the welder.

MODE(S) FOR CARRYING OUT THE INVENTION

The FIGURE shows an exemplary embodiment of the welder according the invention. It is exemplary in that—as mentioned in the disclosure of the invention—numerous combinations of processing and testing tools can be made. The exemplary embodiment describes just one combination.

Welder 100 comprises a bench 122 provided with wheels that can be moved on the production floor. The welder is provided with a clamp 102, a welding part 104, and processing tools 106, 108 and testing tools 110, 112 and 114 that will be described in detail hereinafter. A controller 116 keeps track of the different tool indicator conditions and steers the clamp through line 102'. The welder will be described in conjunction with the procedure that has to be followed.

A first metal wire 150 for example the end that directly comes from a metal wire processing machine like a cabling machine is collected. The second metal wire 150' for example the end of a metal wire that is on a spool of wire winder is fetched. Sufficient length of the first metal wire is led through clamp 102 and the clamp is closed by the operator. This resets all tool indicators to the non-complete condition.

First a weld is made in the welding part 104. The first metal wire is clamped in weld beak 105, the second metal wire in weld beak 105'. Clamps 105 and 105' are well aligned to one another. A weld is made (represented by the dot).

A first processing tool is an annealing tool 106. The annealing tool has two contact pins 107, 107' that allow to heat up the weld by means of electrical current. After the annealing tool 106 has been used the tool indicator of the annealing tool 106 is set to complete through line 106'.

A second processing tool is the diameter adjustment tool 108. In this case this is a hammering tool wherein the weld can be hammered to the correct diameter. Once the hammering tool has been used its tool indicator is set to 'complete' through line 108'. The weld is now ready for testing.

The first testing tool is a diameter testing tool 110 that measures the diameter of the weld. If the diameter does not comply to specification this will be indicated by a red light of lamp 111. Some further hammering with hammer 108 may be required, but this does not alter the status of the hammer tool indicator. If the diameter of the weld complies with the specification the lamp 111 will turn green and the tool indicator will be set to 'complete' through line 110'.

The second testing tool is a bending testing tool 112. This is turnable wheel 112 over which the weld is moved back and forth in order to check whether it is sufficiently ductile to survive bending. Once sufficient back and forth movements of the wheel 112 have been detected the tool indicator is set to 'complete'.

Thereafter the weld is submitted to a strength test in a tensile tester 114. A force 'F' is exerted on the weld through clamps 114. Once the specified load—that is dependent on the metal wire—has been reached, the tensile test tool indicator will be set to complete. If the weld breaks before the specified load is reached the tool indicator will of course not reach the 'complete' status. If other abnormalities are noted during the loading of the tensile tester—for example filaments snapping in the weld—the tensile tester tool indicator will remain in the non-complete condition even when trying to redo the test. There is no other alternative then then to cut out the weld and redo the weld after having reset the tool indicators to non-complete via reset button 120.

When now all tool indicators are set to complete, the clamp 102 is automatically opened and the weld can be wound onto the take-up spool. The use of the clamp ensures that all steps in the procedure have been adequately followed (the 'poka-yoke' or 'inadverted error prevention' principle).

In case an emergency occurs—for example an entanglement of the wire—the clamp can be automatically opened by activating an emergency circuit that in this embodiment is activated by an emergency button 118. Possibly the clamp can be provided with a cutter that cuts the first metal wire so that no catch loops are formed by the weld.

Although the welder and welding method has been described mainly for steel cord, there is nothing that inhibits or impedes the use of the welder or the weld method for other metal wires.

The invention claimed is:

1. A welder comprising
   i) a welding part configured to weld a first metal wire to a second metal wire,
   ii) one or more tools configured to process and/or test the weld,
      wherein each of the one or more tools has a tool indicator configured to indicate a complete or non-complete condition,
         wherein the indicator is settable to non-complete before welding,
   iii) a clamp configured to clamp the first metal wire before welding and to release the first metal wire after each tool indicator is in the complete condition, and
   iv) a controller configured to activate cutting of the first metal wire with a cutter provided with the clamp and then open the clamp upon the activation of an emergency circuit.

2. The welder according to claim 1, wherein said one or more tools comprise one or more processing tools for processing said weld each of said processing tools having a processing tool indicator, said processing tool indicator being set to the complete condition when said processing tool has been used.

3. The welder according to claim 2, wherein said one or more processing tool is selected from the group comprising an annealing tool for annealing said weld, a coating tool for coating said weld and a diameter adjustment tool for adjusting the diameter of said weld.

4. The welder according to claim 1, wherein said one or more tools comprise one or more testing tools for performing a test, each of said testing tools having a testing tool indicator, said testing tool indicator being set to the complete condition when the test on said weld with said testing tool has been completed.

5. The welder according to claim 4, wherein said one or more testing tool is selected from the group comprising a diameter tester for testing the diameter of said weld, a bendability tester for testing the bendability of said weld, a tensile tester for testing the strength of said weld, an electrical resistance tester for testing the electrical resistance of the weld and a colour tester for testing the colour of the weld.

6. A method for welding a first metal wire to a second metal wire by means of the welder according to claim 1 comprising the following steps:
   (a) Providing a first metal wire and a second metal wire;
   (b) Clamping at least said first metal wire in said clamp of said welder and setting each of said tool indicators to the non-complete condition;
   (c) Welding said second metal wire to said first metal wire by means of said weld part;
   (d) Passing said weld through said processing tools for finishing said weld;
   (e) Releasing said first metal wire from said clamp when the condition that all tool indicators are in the complete condition is met.

7. The method according to claim 6 further comprising the step of:
   (d') Using said testing tools to test said weld,
   after step (d) and prior to step (e).

8. The method according to claim 6 further comprising the step of:
   Activating the reset button in case not all tool indicators are in the complete condition,
   at any time after step (b) and prior to step (e).

9. The method according to claim 6 further comprising the step of:
   Activating the emergency circuit
   whenever step (b) has been performed.

10. The method according to claim 7 wherein the step (d') has been automated.

* * * * *